United States Patent [19]

Conti

[11] Patent Number: 5,065,889

[45] Date of Patent: Nov. 19, 1991

[54] COVERED DISH WITH VENT

[75] Inventor: Rino Conti, Stoughton, Mass.

[73] Assignee: Dart Industries Inc., Deerfield, Ill.

[21] Appl. No.: 563,127

[22] Filed: Aug. 3, 1990

[51] Int. Cl.⁵ ............................................. B65D 51/00
[52] U.S. Cl. ..................... 220/366; 220/360; 220/574; 220/912; 220/913
[58] Field of Search ............... 220/360, 366, 913, 574, 220/912

[56] References Cited

U.S. PATENT DOCUMENTS

| | | | |
|---|---|---|---|
| 2,241,064 | 5/1941 | Harbison | 220/360 |
| 3,158,553 | 11/1964 | Carski | 195/139 |
| 3,937,359 | 2/1976 | Stockton, Jr. | 220/369 |
| 4,058,214 | 11/1977 | Mancuso | 206/545 |
| 4,512,497 | 4/1985 | Grusin | 220/369 |
| 4,576,309 | 3/1986 | Tzifkansky et al. | 220/366 |
| 4,600,117 | 7/1986 | Tzifkansky et al. | 220/366 |
| 4,670,398 | 6/1987 | Song | 220/366 X |
| 4,675,298 | 6/1987 | Brusewitz | 435/298 |
| 4,917,262 | 4/1990 | Mita | 220/366 |

FOREIGN PATENT DOCUMENTS

20758 6/1929 Australia .
2307718 11/1976 France .

Primary Examiner—Steven M. Pollard
Attorney, Agent, or Firm—John A. Doninger

[57] ABSTRACT

A casserole dish and cover that cooperate to allow cooking in a vented and unvented condition as well as a controlled transition from a vented to an unvented state. The dish includes a cam ledge and the cover includes a lip that is rotatable and pivotable on the cam ledge to allow controlled venting and access to the interior of the dish.

17 Claims, 6 Drawing Sheets

COVERED DISH WITH VENT

BACKGROUND OF THE INVENTION

This invention relates in general to dishes for cooking, serving and storing food or the like. More particularly this invention relates to a dish with a rim having a cam ledge that cooperates with a cover to allow controlled venting of the interior dish as well as cooking in either a vented or unvented condition.

Dishes used for baking and other cooking applications typically are equipped with a cover so that the foodstuffs within the dish can be covered while being cooked. Covered cooking helps retain heat and moisture within the dish and may otherwise aid the cooking process. Even if covered cooking is not desired the cover can be used while serving to help keep the contents of the dish warm. The term "dish" is used in a general sense to mean ovenware such as a casserole dish suitable for use in an oven such as a microwave oven or a conventional oven. The term "dish" would also include a cooking utensil intended for use on a range-top cooking element.

For some applications it would be advantageous to provide for cooking in either vented or unvented condition. Some recipes call for a combination of both. In microwave cooking especially, it is often necessary to cook for relatively short periods of time and then either remove the dish from the microwave oven to stir the contents or rotate the dish within the oven cavity and cook at a different power level. In addition it may be necessary to cook for a period of time with the dish in a vented condition and then cook for a period of time with the dish in an unvented condition. In such situations it is necessary to safely vent steam or vapor which may have accumulated in the interior of the dish during a cooking cycle. It should also be noted that both conventional and microwave ovens are positioned as high as eye level or as low as under a range top, making some venting arrangements more or less desirable from a use standpoint.

For example, some venting arrangements require that the top surface of the cover be visible because the vent is generally horizontally positioned. This can be a disadvantage if the oven is located at eye level. Other arrangements include a generally vertically positioned vent formed in the downwardly extending rim of a cover or the upwardly extending rim of a dish. Often this type of vent includes notches which must be aligned to cook in a vented or unvented condition. Such notches are considered by some to be less than desirable from a visual standpoint and also present some disadvantages from a utility standpoint. For example, the dish may be turned during a cooking cycle so that the vent is not visible.

SUMMARY OF THE INVENTION

The present invention overcomes the foregoing and other problems of the prior art by providing a dish and cover that can be used in a number of different cooking conditions. The cover and dish cooperate to allow cooking with the cover on the dish in both a vented and unvented condition. The cover is also movable on the dish to safely and easily vent the steam or vapors which accumulate on the interior of the dish when cooking with the cover in an unvented condition.

Stated more specifically, the dish includes a rim having a cam ledge which cooperates with a lip on the cover to allow cooking in a vented or unvented condition. When the cover is on the dish in an orientation which calls for unvented cooking, the cover can be rotated on the cam ledge in such a fashion as to safely and easily vent any steam or vapor built up in the interior of the dish during cooking. Additionally the cover can be pivoted on the cam ledge to direct the initial burst of steam or vapor away from the handles which are being grasped by the user. Handles on the dish and cover serve as convenient indicia of whether the dish is in the vented or unvented condition.

Accordingly, it is an object of the invention to provide an improved cooking dish.

It is another object of the invention to provide a cooking dish with a cover which can be moved between a vented and an unvented position without removing the cover from the dish.

It is still another object of this invention to provide dishes which can be used in a multi-level cooking configuration and allow for controlled venting thereof.

It is yet another object of the invention to provide a cooking dish with a cover that can be simultaneously rotated and pivoted on the dish to safely control venting of the interior of the dish as the cover is moved from an unvented to a vented position.

Other objects and advantages will become more readily apparent from the following description of the preferred embodiment.

BRIEF DESCRIPTION OF THE DRAWINGS

FIG. 9 is a cross-sectional view similar to

FIG. 7, but with the cover turned 90 degrees showing the dish in a vented condition;

DESCRIPTION OF THE PREFERRED EMBODIMENT

Figure 1:
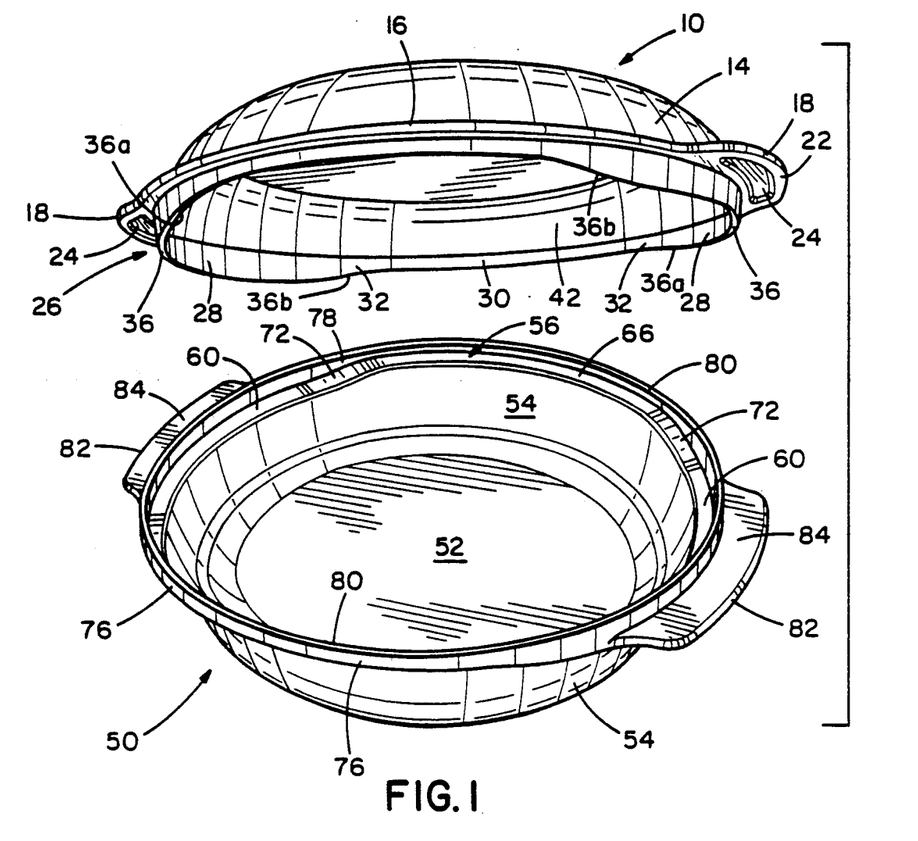
FIG. 1 is an exploded perspective view of the dish with the cover upturned to expose the underside thereof.
Figure 2:
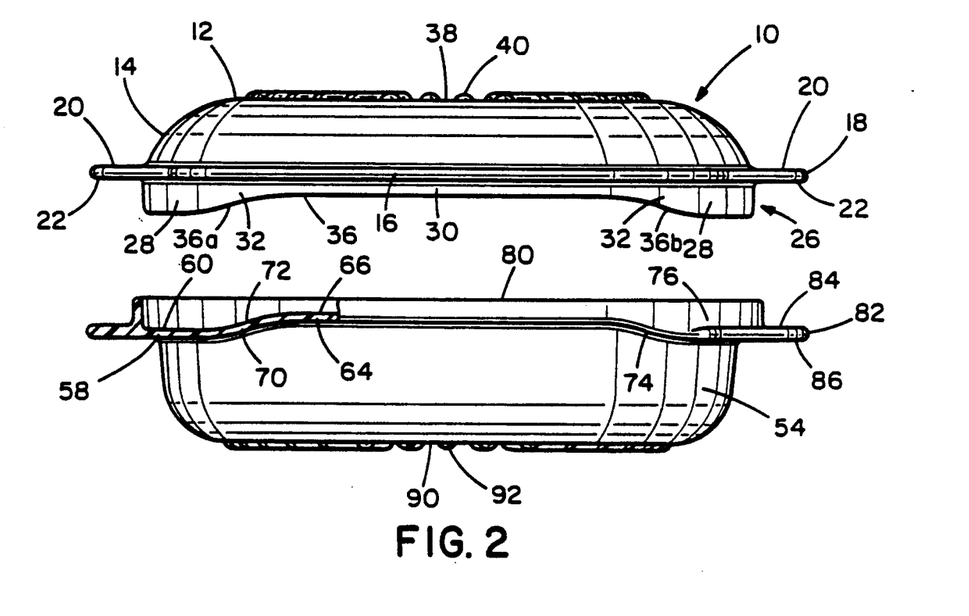
FIG. 2 is an exploded side elevation showing the cover over the dish and with a portion of the dish flange removed.
Figure 3:
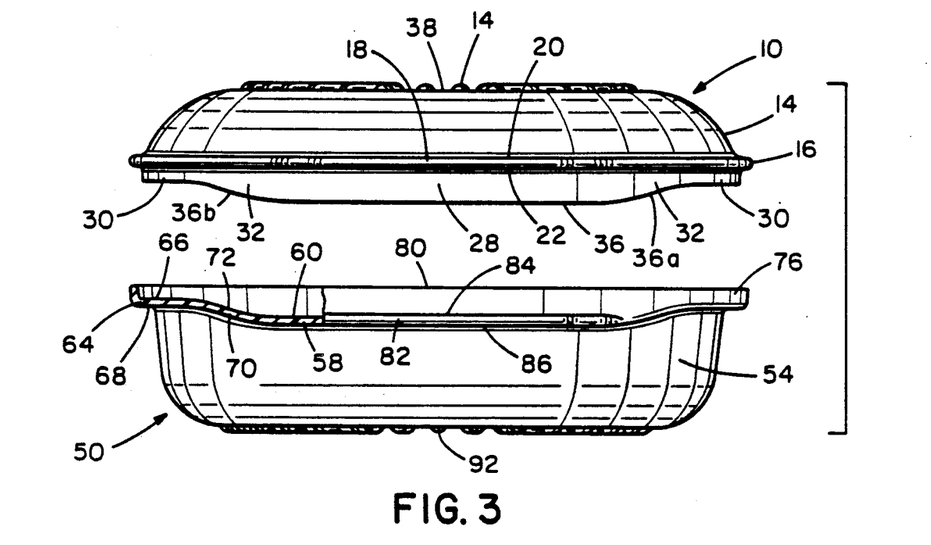
FIG. 3 is an exploded end elevation showing the cover over the dish and with a portion of the dish flange removed.
Figure 4:
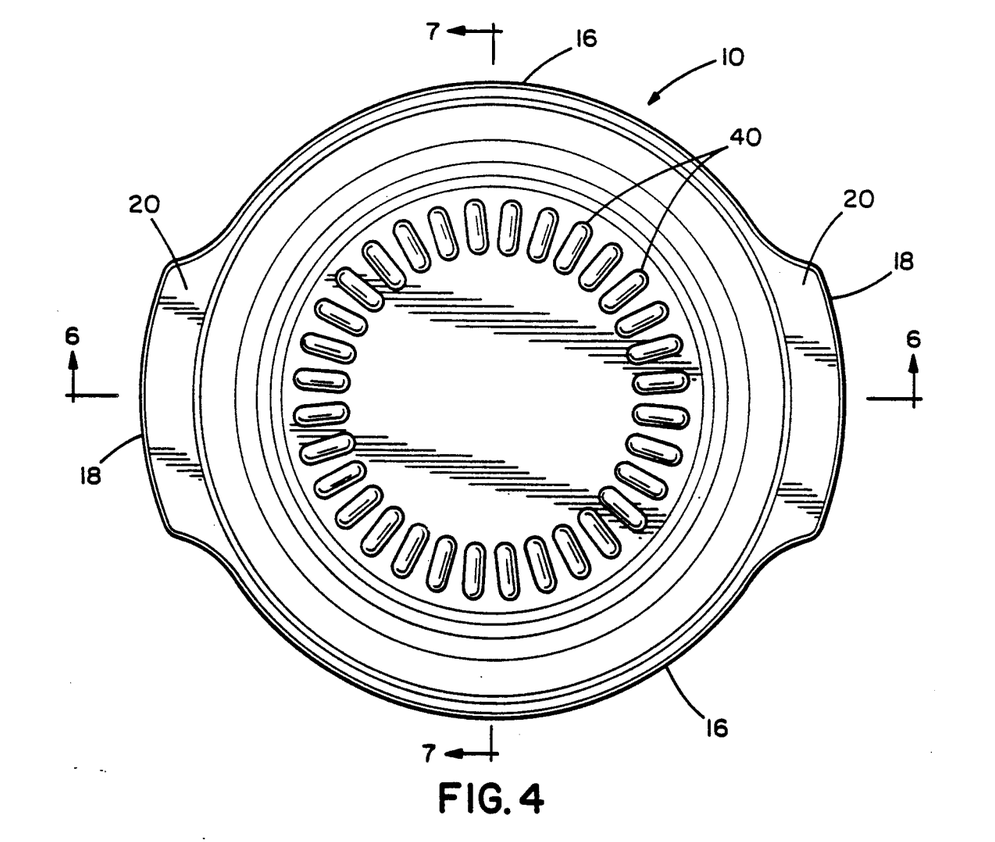
FIG. 4 is a top plan view of the cover in an unvented position on the dish.
Figure 5:
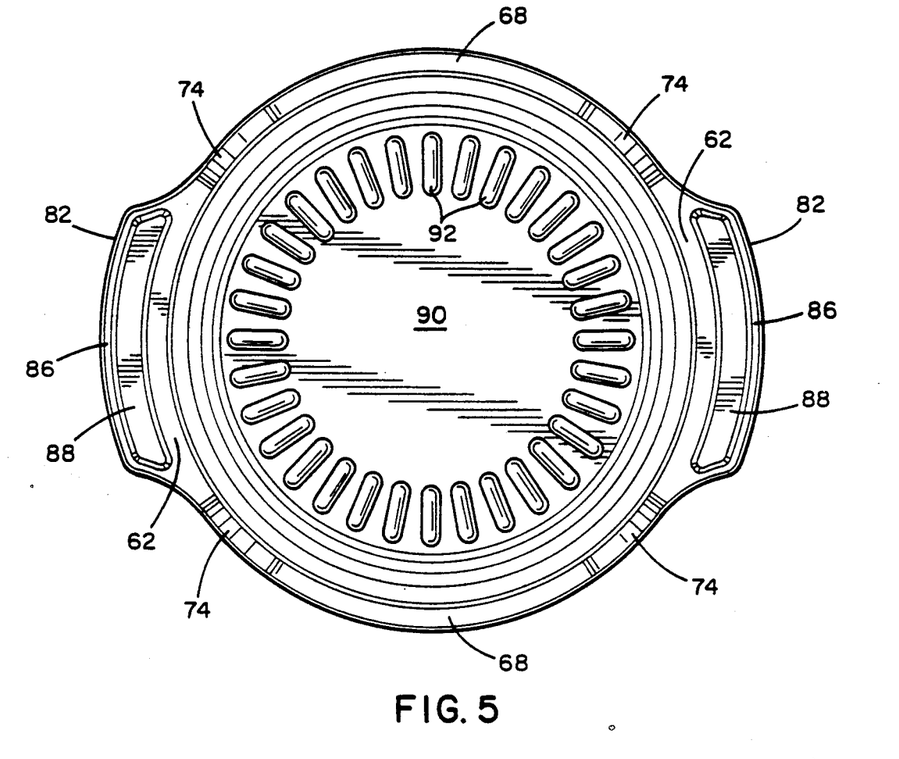
FIG. 5 is a bottom plan view of the dish.

Looking first to FIGS. 1, 2 and 3, there is shown a dish 50 and a complementary cover 10. The dish and cover are intended to be used, for example, as a casserole dish or for other cooking purposes. The dish 50 and cover 10 are made of any suitable material which can withstand both the high temperatures associated with cooking in a microwave or conventional oven and the low temperatures associated with storage in a refrigerator or freezer.

The dish 50, as best seen in FIGS. 1-3 and 6-9, includes a bottom wall 52 which merges with an upwardly extending sidewall 54. The sidewall 54 has a circumferentially disposed and outwardly extending rim that includes a cam ledge 56. An upwardly extending flange 76 surrounds the cam ledge 56. The flange 76 terminates in an upper edge 80 and includes an interior surface 78.

The cam ledge 56 includes oppositely positioned first sections 58 and second sections 64 connected by inclined sections 70. Each of the first sections 58 include upper and lower surfaces 60 and 62, and the second sections 64 each have upper and lower surfaces 66 and 68. The inclined sections 70 are positioned in diametrically opposed pairs and each have an upper surface 72 and a lower surface 74. As can be seen in FIGS. 2 and 3 the second sections 64 are vertically displaced from the first sections 58. The upper surfaces of the first sections 58, the second sections 64 and the inclined sections 70 combine to form a continuous, smooth, upwardly facing cam surface. Similarly the lower surfaces of the first sections 58, the second sections 64 and the inclined sections 70 combine to form a continuous, smooth downwardly facing cam surface. Each inclined surface 72 intersects the adjacent generally horizontal first section upper surface 60 at an obtuse angle.

Oppositely positioned handles 82 are positioned adjacent to the cam ledge first sections 58 and extend outwardly therefrom. Each handle 82 is roughly coextensive with the first section upper surface 60. As can be seen in FIGS. 2 and 3, cam ledge inclined sections 70 are positioned outwardly of the ends of the handles. The handles 82 include a generally flat upper surface 84 and a lower surface 86. The lower surface 84 of each handle has a depression 88 to facilitate gripping. The bottom wall 52 of the dish has an exterior surface 90 with radially extending projections 92 positioned thereon. The projections 92 function to raise the bottom wall 52 off the countertop or over surface and also interfit with similarly shaped projections on the cover 10.

As shown in FIGS. 1, 2 and 3, the cover 10 includes a generally planar top wall 12 which merges with a downwardly extending sidewall 14. An outwardly extending rim 16 is positioned at the lowermost portion of the sidewall 14 and a pair of oppositely positioned handles 18 extend outwardly from the rim 16. The handles 18 include a smooth upper surface 20 and "finger-grippable" depressions 24 are located on the lower surface 22 of each handle.

A lip 26 extends downwardly below the rim 16. The lip 26 includes oppositely positioned first sections 28 and second sections 30 which are connected by diametrically opposed inclined sections 32. The lip 26 terminates in a lip surface 36 which forms a continuous smooth surface contoured to match the cam ledge 56. The lip surfaces 36 adjacent to the diametrically opposed lip sections 32 are identified as 36a and 36b. The lip surfaces 36a and 36b include curved joinders with the surfaces of adjacent lip sections 28 and 30.

The handles 18 extend outwardly from the rim 16 above the oppositely positioned lip first sections 28 and each handle 18 is roughly coextensive with the associated first section 28. As can be seen in FIGS. 1-3 and 10-12, the inclined sections 32 are positioned outwardly of the ends of the handles 18.

Figure 10:
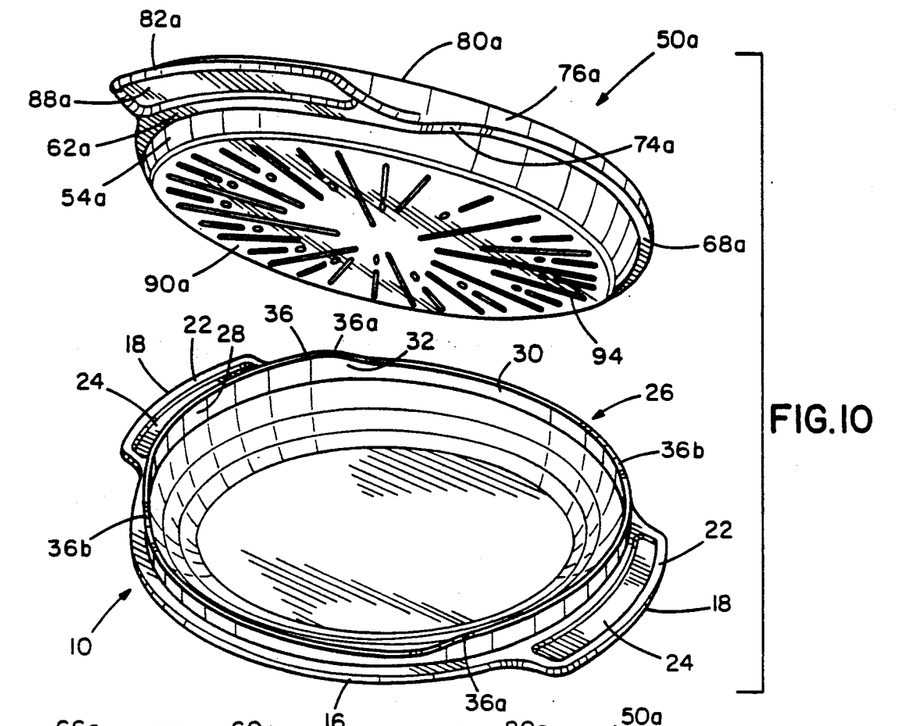
FIG. 10 is an exploded top perspective view of the cover under a dish which is in the form of a grid and with the grid upturned to expose the underside thereof.

The upper surface 38 of the top wall 12 includes radially extending projections 40 adapted to interfit with projections 90 on the dish 50. As can be seen in FIGS. 1 and 10, the interior 42 of the cover 10 is shaped such that it can be turned over and used as a cooking container or as shown in the alternate embodiment in FIGS. 10-14.

Figure 8:
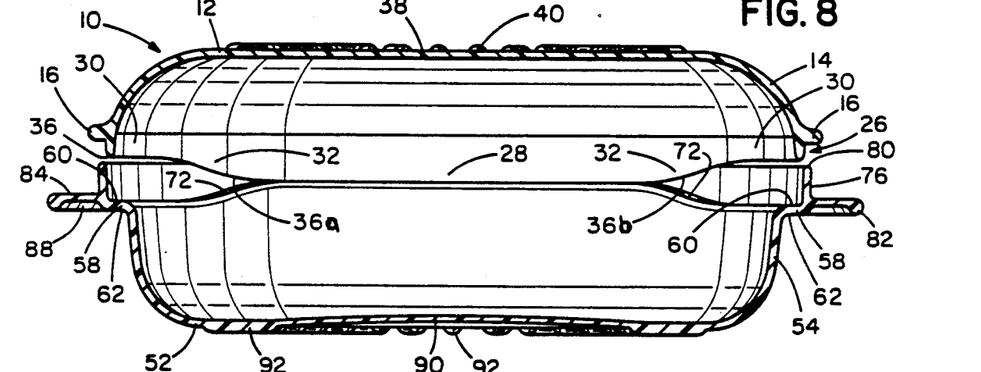
FIG. 8 is a cross-sectional view similar to FIG. 6, but with the cover turned 90 degrees showing the dish in a vented condition.
Figure 9:
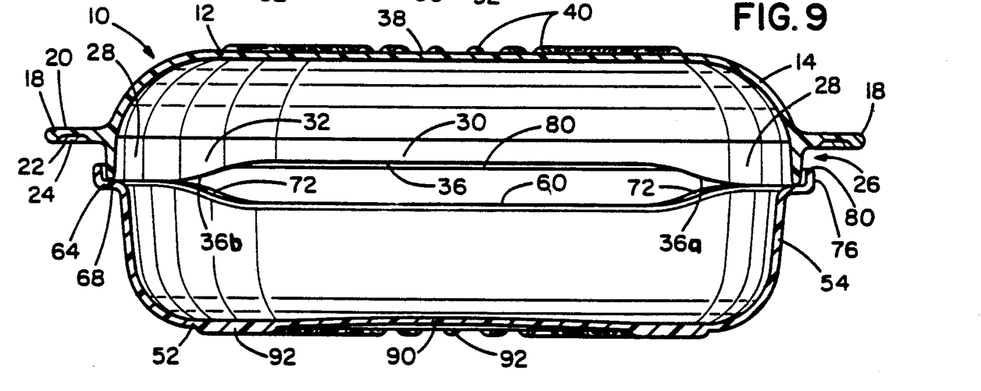

It can now be seen with reference to the drawings that the cover 10 can be oriented on the dish 50 in a closed or unvented position (FIGS. 6 and 7) as well as an open or a vented position (FIGS. 8 and 9). In the unvented position it can be seen that the lip 26 engages the cam ledge 56 and the cover rim 16 engages the upper edge 80 of the dish flange 76. In particular the surface 36 of the lip 26 engages the upper surfaces 60 of the first sections 58, the upper surfaces 66 of the second sections 64 and the upper surfaces 72 of the inclined sections 70 to block access to the interior of the dish 50. The underside of the cover rim 16 simultaneously engages the edge 80 of the upwardly extending dish flange 76 thus creating a labyrinth around which trapped steam or vapor must travel in order to escape.

Figure 6:
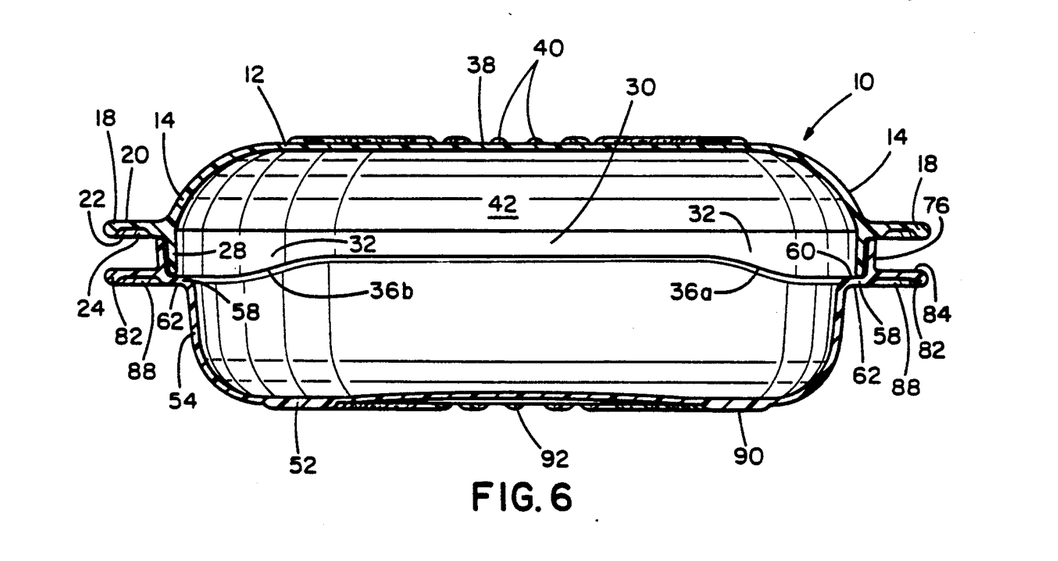
FIG. 6 is a cross-sectional view taken along line 6—6 of FIG. 4.
Figure 7:
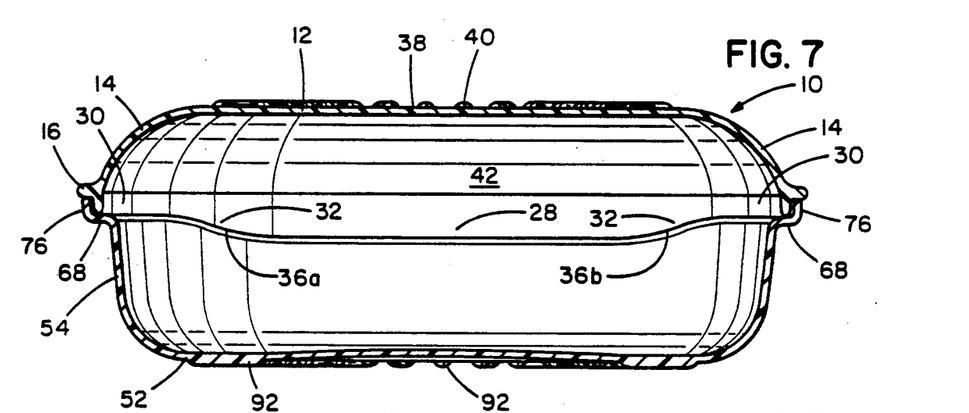
FIG. 7 is a cross-sectional view taken along line 7—7 of FIG. 4.

As can be seen in FIGS. 1, 2 and 6, the dish handles 82 and the cover handles 18 are vertically aligned when the dish 50 and cover 10 are in the closed or unvented position. This provides a convenient reminder to the user that the contents are being heated or stored in the unvented condition. As shown in FIGS. 8 and 9, in the vented position the lip 26 partially engages the cam ledge 56 and the cover rim 16 is entirely removed from engagement with the upper edge 80 of the dish flange 76. In particular it can be seen that with the handles 18 of the cover 10 oriented at 90 degrees relative to the dish handles 82, the lower surfaces 36 of the lip first sections 28 engage the upper surfaces 66 of the cam ledge second sections 64. It should also be understood from the drawings that it is possible to orient the cover 10 in a vented condition relative to the dish 50 at various angular positions on the dish 50. In the vented position of the cover 10 on the dish 50 it can be seen that the dish handles 82 and the cover handles 18 are not aligned, thus providing a convenient visual indication that the cover 10 and dish 50 are being used in the vented condition.

With particular reference to FIGS. 1-3, the manner in which the cover 10 can be moved from the unvented to the vented position can be seen. The cover 10 can be moved from the vented to the unvented position by rotating the cover 10 on the dish 50 in either a clockwise or a counter-clockwise direction. For example, as the cover 10 is rotated in a counter-clockwise direction, the lip surfaces 36a engage the adjacent inclined cam ledge surfaces 72 at diametrically opposed positions on the cam ledge 56. As the user continues to rate the cover 10 in the counter-clockwise direction, the lip surfaces 36a cam up the opposed inclined surfaces 72, thereby lifting the lip surface 36 out of engagement with the cam ledge surfaces 60 and 66. Similarly, if the cover 10 is rotated in a clockwise direction, lip surfaces 36b engage adjacent cam ledge surfaces 72. As the user continues to rotate the cover 10 in a clockwise direction, the lip surfaces 36b cam up the diametrically opposed inclined surfaces 72 of the cam ledge 56 and lift the lip surface 36 out of engagement with cam ledge surfaces 60 and 66. Of course, cover rim 16 simultaneously moves out of engagement with the edge 80 of dish flange 76 when the cover 10 is rotated in either direction. The dish flange 76 also functions to maintain the lip 26 in position over the cam ledge 56.

With the dish handles 82 and the cover handles 18 held parallel to another as the lip 26 is rotated on the cam ledge 56, it will be seen that the initial burst of escaping steam or vapor will evenly dissipate on either side of dish between the second lip section 30 and the cam ledge surface 66. The lip surfaces 36 adjacent the second lip sections 30 will be elevated above the cam ledge surfaces 66 and the flange edge 80 as the cover is rotated, creating direct access to the interior of the dish 50.

Again with reference to FIGS. 1, 2 and 6, assuming counter-clockwise rotation of the cover 10, it will be noted that it is possible for the cover 10 to pivot relative to the dish 50. As the curved joinder of lip surfaces 36a engage the diametrically opposed inclined cam ledge surfaces 72, it can be seen that the cover 10 will not only move in a vertical direction but will also be pivotable on the opposed cam ledge surfaces 72. The pivoting occurs about an axis through the point of contact between the opposed curved joinders on lip surfaces 36a and the inclined cam ledge surfaces 72. This is significant in that it is possible to move the cover 10 from an unvented to a vented position by simultaneously rotating and pivoting the cover 10 with one hand and direct the initial burst of built up steam or vapor at a position on the circumference of the cam ledge 56 opposed to the user's hand.

As can be seen in FIGS. 2 and 6, the cover handles 18 and the dish handles are vertically aligned and the dish 50 and the cover 10 are in the unvented position. Typically a right handed user would grasp the cover handle 18 and the dish handle 82 (located on the right side of FIGS. 2 and 6) with the thumb on the cover handle 18 and the fingers on the depressions 88 in the dish handle 82. Slight downward pressure on the handle 18 as the cover is rotated counter-clockwise will cause the cover 10 to pivot as it is rotated. Of course, the cover lip 16 will engage the upper edge 80 of the dish flange 76 at a point adjacent to the grasped cover handle 18 to limit pivotal movement of the cover 10.

Thus tilted, however, the cover lip surface 36 will separate from the associated cam ledge surfaces 60, 66 and 72 along a circumference of the dish 50 remote from the cover handle 18 and dish handle 82 which are being grasped by the user. A similar result will occur if the cover 10 is rotated in a clockwise direction and pivoted about inclined section lip surfaces 36b. It should also be clear that in a tilted position it is possible for the lip surface 36 to be spaced from the associated cam ledge surfaces 60, 66 and 72 enough to accommodate a temperature probe or the like.

Turning now to FIGS. 10-14, an alternate embodiment of the dish 50 in the form of a grid 50a can be seen. Elements comparable to those found on the dish 50 are identified with an "a" in combination with the numeral. The grid 50a includes a bottom wall 52a which merges with an upwardly extending sidewall 54a. The sidewall 54a has a circumferentially disposed and outwardly extending rim that includes a cam ledge 56a. An upwardly extending flange 76a surrounds the cam ledge 56a. The flange 76a terminates in an upper edge 80a and includes an interior surface 78a.

Figure 11:
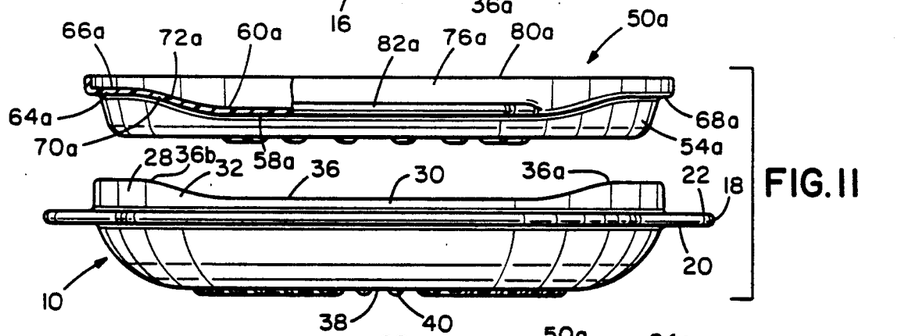
FIG. 11 is an exploded side elevation of the cover in position under the grid and with a portion of the flange removed.
Figure 12:
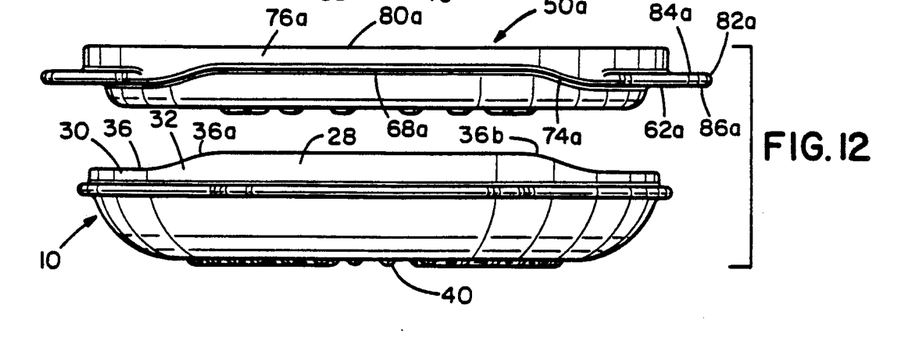
FIG. 12 is an exploded end elevation of the cover in position under the grid.
Figure 13:
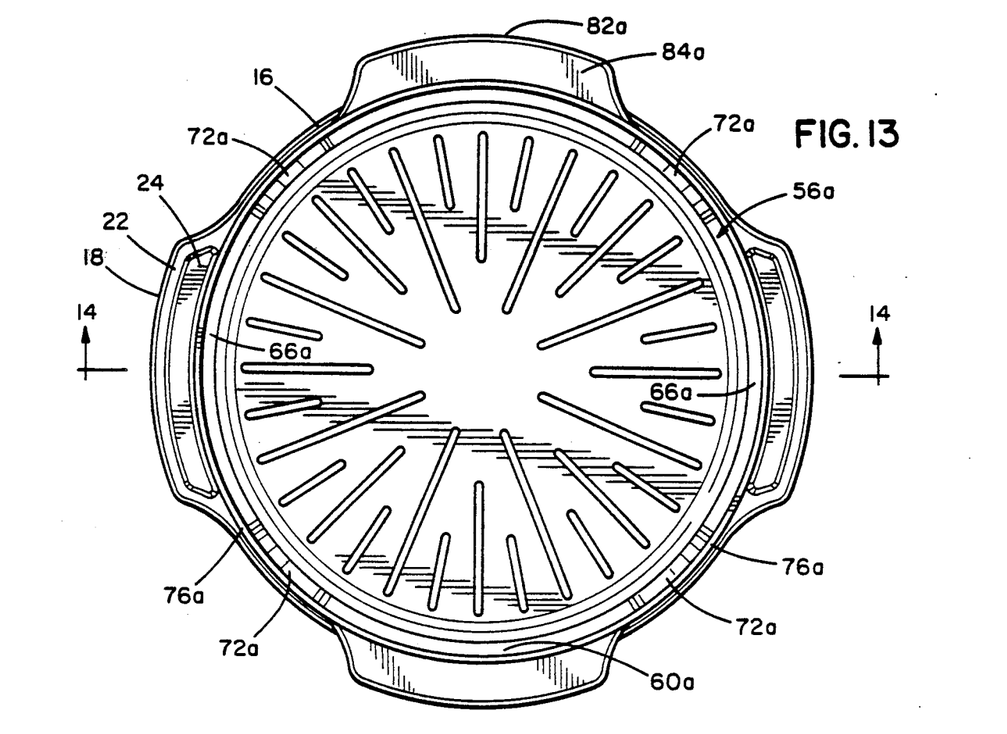
FIG. 13 is a top plan view of the dish in the form of a grid positioned on the cover.
Figure 14:
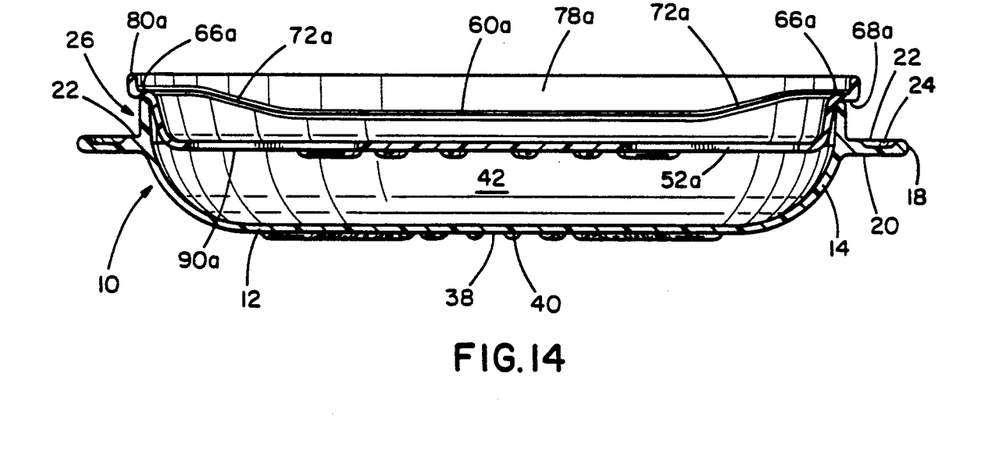
FIG. 14 is a cross-sectional view taken along line 14—14 of FIG. 13.

The cam ledge 56a includes oppositely positioned first sections 58a and second sections 64a connected by inclined sections 70a. Each of the first sections 58a include upper and lower surfaces 60a and 62a, and the second sections 64a each have upper and lower surfaces 66a and 68a. The inclined sections 70a are positioned in diametrically opposed pairs and each have an upper surface 72a and a lower surface 74a. As can be seen in FIGS. 11 and 14, the second sections 64a are vertically displaced from the first sections 58. The upper surfaces of the first sections 58a, the second sections 64a and the inclined sections 70a combine to form a continuous, smooth, upwardly facing cam surface. Similarly the lower surfaces of the first sections 58a, the second sections 64a and the inclined sections 72a combine to form a continuous, smooth downwardly facing cam surface. Each inclined surface 70a intersects the adjacent generally horizontal first section upper surface 60a at an obtuse angle.

Oppositely positioned handles 82a are positioned adjacent to the cam ledge first sections 58a and extend outwardly therefrom. Each handle 82a is roughly coextensive with the first section upper surface 60a. As can be seen in FIGS. 2 and 3, cam ledge inclined sections 70a are positioned outwardly of the ends of the handles. The handles 82a include a generally flat upper surface 84a and a lower surface 86a. The lower surface 84a of each handle has a depression 88a to facilitate gripping. The bottom wall 52a of the dish has an exterior surface 90a with a plurality of projections thereon for spacing the grid bottom wall 52a from an adjacent surface such as a countertop.

In the configuration shown in FIGS. 10-14, the cover 10 is turned over with the lip 26 extending upwardly. In the position, shown the lip 26 engages the cam ledge 56a such that the lip surface 36 engages the first section lower surfaces 62a, the second section lower surfaces 68a and the inclined section lower surfaces 74a. In the event that the slots 94 are omitted from the grid 50a, this position would correspond to an unvented position. The grid 50a also is rotatable on the lip 26 from the position shown in FIGS. 11-14 to a position wherein the grid handles 82a are aligned with the cover handles 18. In this position the grid second section lower surfaces 62a engage the lip surfaces 36 associated with of lip section 28. This position would correspond to a vented position in the event the drain slots 94 are omitted from the grid 50a. Simultaneous rotation and pivotal movement of the grid 50a on the lip 26 is also possible as the diametrically opposed inclined sections 74a engage lip surfaces 36a or 36b.

In this configuration it is possible to cook items on the upper surface of the grid 50a. If a second cover 10 is available, items may be cooked in a covered and vented or unvented condition. The cover 10 is positionable and movable on the cam ledge 56a in the same fashion as previously described with regard to the dish 50. It should also be noted that the grid 50a will fit on the dish 50 to present the possibility of multi-level cooking. In this configuration the first section lower surfaces 62a of the grid 50a will engage the upper edge 80 of dish flange 76 and can be interposed between the dish 50 and the cover 10. Foodstuffs can be placed on the bottom wall of the grid 50a as well as in the dish 50. It should be further noted that the interfitting of the projections 92a on the dish 50 with the projections 40 on the cover 10 presents the possibility of stacking two containers for cooking. All of the foregoing stacked cooking possibilities are especially useful when cooking or reheating food in a microwave oven. It should be apparent that the forgoing relates only to a preferred embodiment of the present invention, and that modifications and changes may be made therein without departing from the spirit and scope of the invention defined in the following claims.

I claim:

1. An apparatus for cooking, serving and storing food and the like, comprising:

a dish having a bottom wall and a sidewall, said bottom wall and sidewall defining a dish interior;

a cam ledge on said sidewall peripherally about said sidewall;

a cover having a top wall and a sidewall, a lip extending downwardly from said cover sidewall peripherally about said cover;

said cover being selectively rotatable in opposed directions and vertically movable on said cam ledge between an unvented position wherein said lip engages said cam ledge peripherally about said dish to block access to the interior of the dish between said dish and said cover and a vented position wherein said cover is generally elevated relative to said dish and said lip partially engages said cam ledge to allow access to the interior of the dish; said lip, in the vented position of said cover, being in point contact with said cam ledge at a pair of points on said ledge aligned transversely across said dish and defining a pivot axis, said cover being pivotally movable about said axis to selectively pivot the cover from the dish and define a venting space therebetween.

2. The apparatus of claim 1 wherein said cam ledge includes a pair of peripherally elongated opposed first sections and a pair of peripherally elongate opposite second sections generally transversely oriented between said first sections to provide adjacent alternating first and second sections, said first sections being vertically displaced below said second sections and an inclined section between each first section and the adjacent second sections for movement of said cover from said unvented position to said vented position upon rotation of said cover relative to said dish.

3. The apparatus of claim 2 wherein said first and second sections define generally horizontal and parallel surfaces.

4. The apparatus of claim 3 wherein said cover lip includes a lower surface contoured to match said cam ledge and similarly include a pair of first sections, a pair of second sections vertically displaced above said first lip first sections, and inclined sections between said lip first and second sections.

5. The apparatus of claim 4 wherein, in said unvented position, said lip first, second and inclined sections engage with and conform to said first, second and inclined sections of said dish ledge to restrict venting of fluid between said cover and said dish, said cover being rotatable beyond said first-mentioned vented position to a second vented position, said cover in said second vented position having said lip first sections received on and supported by said ledge second sections along at least a major portion of the length of these sections to maintain a generally parallel relation between said cover and said dish with a vertical elongate space defined between each lip second section and an underlying ledge first section.

6. The apparatus of claim 5 including a dish handle projecting radially outward from said dish in general radial alignment with a first section of said dish ledge, and a cover handle projecting radially outward from said cover in general radial alignment with a first section of said cover lip, said cover handle being vertically aligned with said dish handle in said unvented position of said cover and rotationally offset from said dish handle in said vented positions.

7. The apparatus of claim 6 wherein said ledge sections include parallel upper and lower surfaces for engagement of said cover lip with said lower surfaces upon inversion of said cover with said lip extending upward.

8. The apparatus of claim 7 including a flange on said dish extending upward from said cam ledge immediately outward thereof and peripherally thereabout, said flange terminating in an upper edge, said cover including a rim extending radially outward therefrom above said lip, said rim engaging said flange edge in said unvented position to further restrict venting of fluid.

9. The apparatus of claim 8 wherein, in said second vented position, said cover lip is at least partially spaced above said dish flange in alignment with each dish first section.

10. The apparatus of claim 5 including a flange extending upward from said cam ledge immediately outward thereof and peripherally thereabout, said flange terminating in an upper edge, said cover including a rim extending radially outward therefrom above said lip, said rim engaging said flange edge in said unvented position to further restrict venting of fluid.

11. The apparatus of claim 10 wherein, in said second vented position, said cover lip is at least partially spaced above said dish flange in alignment with each dish first section.

12. The apparatus of claim 1 including a flange extending upward from said cam ledge immediately outward thereof and peripherally thereabout, said flange terminating in an upper edge, said cover including a rim extending radially outward therefrom above said lip, said rim engaging said flange edge in said unvented position to further restrict venting of fluid.

13. An apparatus for cooking, serving and storing food and the like, comprising:

a dish having a bottom wall and an annular sidewall, said bottom well and sidewall defining a dish interior;

a cam ledge on said sidewall peripherally about said sidewall;

a cover having a top wall and an annular sidewall, a lip extending downwardly from said cover sidewall peripherally thereabout;

said cover being selectively rotatable in opposed directions and vertically movable on said cam ledge between an unvented position wherein said lid engages said cam ledge to block access to the interior of the dish and a vented position wherein said lip partially engages said cam ledge to allow access to the interior of the dish;

said cam ledge including a first pair of opposed peripherally elongate sections and a second pair of opposed peripherally elongate sections, said first and second sections alternating along said cam ledge with said first sections being vertically displaced downward from said second sections, and two pairs of opposed inclined sections, each inclined section extending between adjacent first and second sections;

said cover lip including a lower surface contoured to match said cam ledge and similarly include a pair of first sections, a pair of second sections vertically displaced above said first lip first sections, and inclined sections between said lip first and second sections, wherein, in said unvented position, said lip first, second and inclined sections engage with and conform to said first, second and inclined sections of said dish ledge to restrict venting of fluid between said cover and said dish;

said cover being rotatable beyond said first-mentioned vented position to a second vented position, said cover in said second vented position having said lip first sections received on and supported by said ledge second sections along at least a major portion of the length of these sections to maintain a generally parallel relation between said cover and said dish with a vertical elongate space defined between each lip section and an underlying ledge first section; wherein said cover, at said first mentioned vented position being in constant contact solely at opposed pivot points, defining a pivot axis, on one of the pairs of inclined sections of the dish ledge for pivotal movement of said cover relative to said dish about said axis.

14. The apparatus of claim 13 including a dish handle projecting radially outward from said dish in general radial alignment with a first section of said dish ledge, and a cover handle projecting radially outward from said cover in general radial alignment with a first section of said cover lip, said cover handle being vertically aligned with said dish handle in said unvented position of said cover and rotationally offset from said dish handle in said vented positions.

15. The apparatus of claim 14 wherein said ledge sections include parallel upper and lower surfaces for engagement of said cover lip with said lower surfaces upon inversion of said cover with said lip extending upward.

16. The apparatus of claim 15 including a flange on said dish extending upward from said cam ledge immediately outward thereof and peripherally thereabout, said flange terminating in an upper edge, said cover including a rim extending radially outward therefrom above said lip, said rim engaging said flange edge in said unvented position to further restrict venting of fluid.

17. The apparatus of claim 16 wherein, in said second vented position, said cover lip is at least partially spaced above said dish flange in alignment with each dish first section.

* * * * *